United States Patent [19]

McCracken

[11] Patent Number: 5,137,250

[45] Date of Patent: Aug. 11, 1992

[54] TIE ROD BEARING UNIT FOR USE IN CONCRETE FORM ASSEMBLIES

[75] Inventor: Robert G. McCracken, Des Moines, Iowa

[73] Assignee: Economy Forms Corporation, Des Moines, Iowa

[21] Appl. No.: 461,163

[22] Filed: Jan. 5, 1990

[51] Int. Cl.⁵ ............................................ E04G 17/065
[52] U.S. Cl. .................... 249/40; 249/219.2; 403/168; 403/262
[58] Field of Search ............... 249/219.2, 39, 38, 40, 249/45, 190; 403/167, 168, 262

[56] References Cited

U.S. PATENT DOCUMENTS

| | | | |
|---|---|---|---|
| 3,920,214 | 11/1975 | Lovisa et al. | 249/219.2 |
| 4,044,987 | 8/1977 | Tausanovitch et al. | 249/219.2 |
| 4,254,932 | 3/1981 | Darbin | 249/38 |
| 4,350,318 | 9/1982 | Gallis | 249/219.2 |
| 4,880,204 | 11/1989 | Steele | 249/219.2 |

Primary Examiner—Jay H. Woo
Assistant Examiner—Khanh P. Nguyen
Attorney, Agent, or Firm—Kent A. Herink; Brian J. Laurenzo

[57] ABSTRACT

A tie rod bearing unit for use in connecting together a pair of oppositely facing wall form structures of a concrete form assembly including upright structural beams with spaced-apart, back-to-back channel members, each of which has a pair of transversely opposite leg sections and an interconnecting web section. The tie bearing unit includes a bearing plate from a first side of which projects an open box member. In position against a beam, the box member of the tie bearing unit is in a friction fit with the web sections within the space between the channel members and the first side of the bearing plate is in contact engagement with the leg sections of the beam. A tie rod of the form assembly bears against the opposite or second side of the bearing plate. The tie rod bearing unit strengthens the beam and distributes the forces exerted by the tie rod.

6 Claims, 1 Drawing Sheet

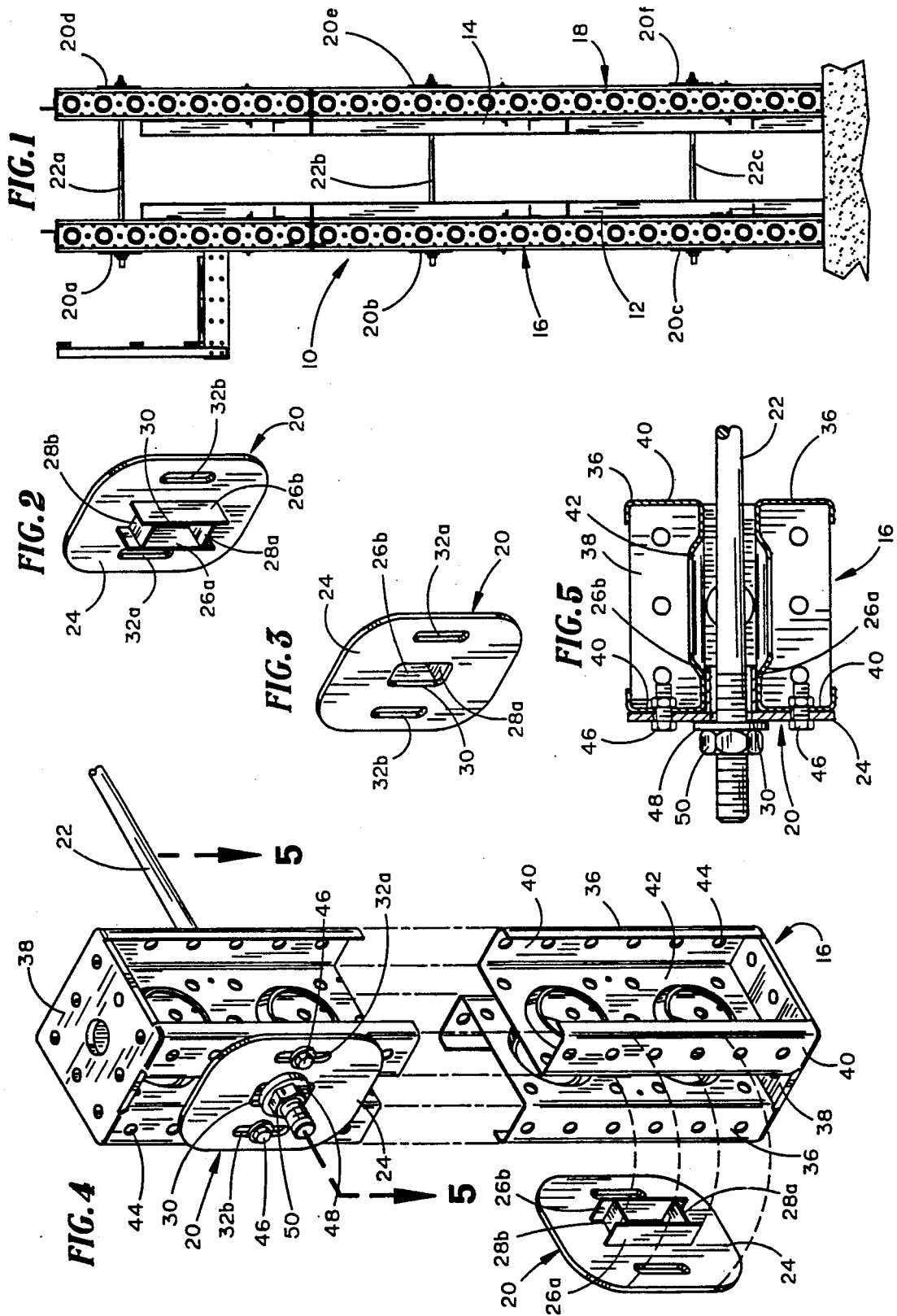

TIE ROD BEARING UNIT FOR USE IN CONCRETE FORM ASSEMBLIES

BACKGROUND OF THE INVENTION

The invention relates to concrete form assemblies and, more specifically, to a tie rod bearing unit for use in connecting together two opposing form structures used in constructing a concrete wall.

Metal concrete forming systems are well known and widely used in the construction of diverse concrete structures. When constructing concrete wall structures, a pair of opposing metal form structures are assembled in a face-to-face relation separated by a distance equal to the thickness of the wall to be formed. Since considerable outward pressure is exerted to push the forms apart by the wet and curing concrete, the pair of form structures must be firmly and rigidly tied together. Conventional systems rely on a plurality of tie rods extended between and secured at opposite ends to the structures.

Certain concrete forming systems make use of supporting beam assemblies including upright beams to which a plurality of wall forms are secured. The present invention provides a tie bearing unit for use in anchoring tie rods to upright beams associated with a form assembly. The tie bearing unit both strengthens the beam to permit it to accommodate heavier loading and distributes the tie rod forces over a larger area of the beam.

SUMMARY OF THE INVENTION

The invention consists of a tie rod bearing unit for securing the ends of a tie rod in a concrete form assembly which includes upright structural beams having spaced-apart, back-to-back channel members. The bearing unit includes a bearing plate that has a longitudinal and a transverse axis. A pair of parallel, longitudinally extended plates project laterally from one side of the bearing plate on either side of the longitudinal axis and are spaced apart by a distance to provide a friction fit between the channel members of the beam. Also extended laterally of the on side of the bearing plate and spaced to either side of the transverse axis are a pair of transverse plates that are secured at their end portions to the longitudinal plates intermediate the ends thereof. The longitudinal and transverse plates form an open box structure. A central opening in the bearing plate extends between the two pairs of plates. The tie bearing unit is releasably secured to the beam by a pair of bolt assemblies that extend through aligned openings in the bearing plate and the channel members.

BRIEF DESCRIPTION OF THE DRAWINGS

FIG. 1 is an end elevational view of a metal concrete form assembly that includes a pair of oppositely facing form structures that are connected together by a plurality of tie rods and tie rod bearing units;

FIG. 2 is a rear perspective view of a tie rod bearing unit;

FIG. 3 is a front perspective view of the rod tie bearing unit of FIG. 2;

FIG. 4 is a perspective view of a foreshortened supporting beam of a form assembly showing one tie rod bearing unit secured to the beam and a second tie rod bearing unit in position for securement on the beam as illustrated by broken lines; and FIG. 5 is a cross-sectional view taken along the line 5—5 of FIG. 4 and showing the frictional fit of the tie rod bearing unit between spaced-apart channel members of the beam.

DETAILED DESCRIPTION OF A PREFERRED EMBODIMENT

Illustrated in FIG. 1, generally at 10, is a metal concrete form assembly for use in forming a concrete wall structure. The form assembly 10 includes a pair of oppositely facing form structures 12 and 14 which are secured to a plurality of upright structural beams, two of which are shown at 16 and 18, respectively. Concrete is poured into the gap between the form structures 12 and 14 to form the concrete wall structure. The spacing of the wall forms 12 and 14 is maintained against the outward force of wet and curing concrete by a plurality of tie rod bearing units, six of which are illustrated at 20a–f, and associated tie rods, three of which are illustrated at 22a–c.

Each tie rod bearing unit 20 includes a generally rectangular bearing plate 24 the corners of which are rounded (FIGS. 2 and 3). As best illustrated in FIG. 3, the bearing plate 24 has a central opening 30 and a pair of elongated openings 32a and 32b spaced transversely on either side of the central opening 30. Projected laterally from a first side of the bearing plate 24 is a pair of parallel, longitudinally extended plates 26a and 26b that are spaced apart on either side of the longitudinal axis of the bearing plate 24. Also projected laterally from the first side of the bearing plate 24 is a pair of parallel, transversely extended plates 28a and 28b that are spaced apart on either side of the transverse axis of the bearing plate 24. Each of the transverse plates 28a and 28b are secured at one end thereof to the longitudinal plate 26a and at the opposite end thereof to the longitudinal plate 26b such that a portion of the longitudinal plates 26a and 26b extends beyond the transverse plates 28a and 28b. The combination of the longitudinal plates 26 and the transverse plates 28 forms an open box structure about the central opening 30 and having extended longitudinal sides.

Referring now to FIG. 4, there is illustrated the foreshortened beam 16 of the form assembly 10 (FIG. 1). Only the beam 16 will be described in detail, it being understood that the other beams are similar. The beam 16 is comprised of a pair of channel members 36 arranged back-to-back in a spaced relation and secured together at each end by an end plate 38. Each channel member 36 includes a pair of transversely opposite leg sections 40 and an interconnecting web section 42. A plurality of holes 44 are longitudinally spaced at regular intervals in the leg sections 40.

The web sections 42 are spaced apart by a distance to receive in a frictional fit longitudinal plates 26a and 26b, as illustrated in FIG. 5, with the bearing plate 24 in contact engagement with the leg sections 40 of the beam 16. The tie rod bearing unit 20 can be positioned at any convenient location along the length of the beam 16 and may be releasably attached thereto by a pair of bolt assemblies 46 each of which is inserted through one of the elongated openings 32a and 32b and an aligned hole 44 in the leg sections When in position against the beam 16, the central opening 30 communicates with the space the web sections 42 of the channel members 36 so that a tie rod 22 having threaded end portions can be inserted therethrough. A large washer 48 and a nut 50 for threaded engagement with each end of the tie rod 22 will hold the tie rod 22 against displacement from the tie bearing unit 20 through the beam 16.

In the preferred embodiment, the bearing plate 24 (FIG. 2) is made of one-half inch steel and the longitudinal plates 26 and transverse plates 28 are made of three-sixteenths inch steel. The channel members 36 of the beam 16 are made of one-eighth inch steel for convenient handling of the beam. The friction fit of the longitudinal plates 26 against the web sections 42 of the channel members 36 strengthens the channel members and further distributes the tie rod forces. The transverse plates further strengthen the tie rod bearing unit by stiffening the longitudinal plates 26 and increasing the resistance of the web sections to inward deformation and failure. The elongated openings 32 and associated bolt assemblies 46 permit the tie rod bearing unit to be loosely attached in place during insertion and adjustment of the tie rods 22.

Tie tie rods 22 in the preferred embodiment are tapered from one end at a diameter of approximately one-and-one-quarter inch to the other end at a diameter of approximately one inch. After the concrete has cured sufficiently to remove the form structures, the tie rods 22 can be removed from the concrete wall by being out in the direction of the larger diameter end. Of courses other conventional tie rods can also be employed.

Although the invention has been described with respect to a preferred embodiment thereof, it is to be understood that it is not to be so limited since changes and modifications can be made therein which are within the full intended scope of the invention as defined by the appended claims.

I claim:

1. A tie rod bearing unit for use with a tie rod in connecting together a pair of upright concrete form structures in a transversely spaced relation to form a concrete wall structure therebetween and wherein at least one of said structures is secured to an upright supporting beam that includes a pair of channel members connected together in a back-to-back, spaced relation, said tie rod bearing unit comprising:

(a) a bearing plate having a longitudinal axis and a transverse axis;
   (b) a pair of spaced-apart parallel, longitudinally extended plates projected laterally from an integrated with one side of said bearing plate on either side of said longitudinal axis and spaced apart to provide a friction fit between the channel members of the beam;
   (c) a pair of spaced-apart parallel, transversely extended plates projected laterally from and integrated with said one side of said bearing plate on either side of said transverse axis for connecting said pair of longitudinal plates such that an end portion of each of said longitudinal plates extends beyond said transversely extended plates;
   (d) said bearing plate having a central opening extended longitudinally between said transverse plates and transversely between said longitudinal plates through which is extended one end of the tie rod; and
   (e) means releasably attachable to said one end of the tie rod for preventing withdrawal thereof through said central opening.

2. A tie rod bearing unit for use with a tie rod in connecting together a pair of upright concrete form structures in a transversely spaced relation to form a concrete wall structure and wherein one of said structures is secured to an upright supporting beam that includes a pair of channel members connected together in a back-to-back, spaced relation, said tie rod bearing unit comprising:

(a) a bearing plate;
   (b) an open box member integrated with one side of said bearing plate includings a pair of longitudinal side members and a pair of transverse end members interconnected to said side members such that an end portion of each of said longitudinal side members extends beyond said end members;
   (c) said side members being spaced apart a distance for reception in contact engagement with the channel members of the beam; and
   (d) said bearing plate having a central opening extended between said side members and said end members.

3. The tie rod bearing unit as defined in claim 2, further comprising means for releasably securing said bearing plate to the beam.

4. The tie rod bearing unit as defined in claim 3, wherein said securement means includes a throughbore formed in said bearing plate and spaced outwardly from each of said side members and a pair of bolt assemblies insertable therethrough.

5. The tie rod bearing unit as defined in claim 2, wherein said box member acts to prevent deformation of said channel members during formation of the concrete wall.

6. The tie rod bearing unit as defined in claim 1, wherein the tie rod has threaded end portions and said attachment means includes a washer and nut.

* * * * *